United States Patent [19]
Okuda

[11] Patent Number: 5,575,839
[45] Date of Patent: Nov. 19, 1996

[54] STENCIL PRINTING EMULSION INK

[75] Inventor: Sadanao Okuda, Tokyo, Japan

[73] Assignee: Riso Kagaku Corporation, Tokyo, Japan

[21] Appl. No.: 364,791

[22] Filed: Dec. 27, 1994

[30] Foreign Application Priority Data

Dec. 27, 1993 [JP] Japan .................... 5-332422

[51] Int. Cl.⁶ ............. C09D 11/02; C09D 11/06; C09D 11/08
[52] U.S. Cl. ............. 106/20 C; 106/27 R; 106/28 R; 106/32
[58] Field of Search ............. 106/20 R, 20 C, 106/27 R, 23 R, 32, 28 R

[56] References Cited

U.S. PATENT DOCUMENTS

| | | | |
|---|---|---|---|
| 2,839,412 | 6/1958 | Igler et al. | 106/28 A |
| 3,421,910 | 1/1969 | Gilson et al. | 106/30 B |
| 3,615,750 | 6/1970 | Blair | 106/27 R |
| 3,823,020 | 7/1974 | Gilson et al. | 106/30 B |
| 4,981,517 | 1/1991 | DeSanto, Jr. et al. | 106/28 R |
| 5,047,084 | 9/1991 | Miller et al. | 106/22 E |
| 5,378,739 | 1/1995 | Koike et al. | 106/20 R |
| 5,389,130 | 2/1995 | Batlaw et al. | 106/28 R |
| 5,395,435 | 3/1995 | Mizobuchi | 106/27 R |

FOREIGN PATENT DOCUMENTS

| | | |
|---|---|---|
| 372671 | 12/1992 | Japan . |
| 070730 | 3/1993 | Japan . |
| 009912 | 1/1994 | Japan . |

*Primary Examiner*—Helene Klemanski
*Attorney, Agent, or Firm*—Fay, Sharpe, Beall, Fagan, Minnich & McKee

[57] ABSTRACT

A stencil printing emulsion ink which is excellent in drying property and temperature suitability and has high ink concentration in printed areas and less bleeding is provided. The emulsion ink is of a water-in-oil type having a water phase dispersed in an oil phase, wherein said emulsion ink consists of 10 to 70% by weight of an oil phase and 90 to 30% by weight of a water phase, and said water phase contains a water-insoluble coloring agent.

7 Claims, No Drawings

STENCIL PRINTING EMULSION INK

BACKGROUND OF THE INVENTION

1. Field of the Invention

The present invention relates to a stencil printing emulsion ink. More specifically, it relates to a stencil printing emulsion ink which has excellent drying properties and temperature suitability and has high ink concentrations in printed area and less bleeding and strike through thereof.

2. Description of the Prior Art

Stencil printing is carried out by platemaking using a stencil printing sheet and passing an ink through the perforated portions to print on a body to be printed such as paper and the like. This stencil printing has ease of preparation in the platemaking and, therefore, is used in board fields.

As for a stencil printing ink, a water-in-oil (W/O) type emulsion ink is generally used, and pigments and resin components are contained as a coloring agent in the oil phase component of the W/O type emulsion ink (Japanese Pat. Laid-Open Pub. Nos. 61-255967, 64-14284, 4-132777, 5-117565, etc.).

When a W/O type emulsion ink is used for printing on a substrate to be printed such as paper, generally the oil phase first permeates into the substrate to be printed as an outer phase of the emulsion, and then, a water phase as an inner phase thereof permeates and/or splashes the substrate. The oil phase contains the pigment components in such a W/O type emulsion ink, and it therefore takes a long time for the ink to dry. As a result, bleeding of the ink readily occurs. Also, the ink components permeate into the deep portion of the paper layer, and therefore, strike through of the ink readily occurs.

Furthermore, since the oil phase contains a resin component for improving the stable dispersion of the pigments and the fixation thereof onto the paper and this resin component undergoes a large viscosity change relative to temperature, there are disadvantages in that it is hard to ensure the viscosity stability of the ink and the permeation velocity of the ink into the paper is delayed due to the presence of the resin component.

SUMMARY OF THE INVENTION

It is a main object of the present invention to provide a stencil printing emulsion ink which solves the above-mentioned problems of the prior art, improves the drying property of the ink and the temperature suitability, and has good ink concentration in the printed areas of the substrate with less bleeding and strike through of the ink.

The inventions claimed in the present application are as follows:

(1) A stencil printing emulsion ink of a water-in-oil type having a water phase dispersed in an oil phase, wherein the emulsion ink consists of 10 to 70% by weight of an oil phase and 90 to 30% by weight of a water phase, and the water phase contains a water-insoluble coloring agent;

(2) A stencil printing emulsion ink according to item (1), wherein the water-insoluble coloring agent is contained in the range of from 1 to 30% by weight of the total amount of the emulsion ink;

(3) A stencil printing emulsion ink according to item (1), wherein the mean particle diameter of the water-insoluble coloring agent is 10 μm or less;

(4) A stencil printing emulsion ink according to item (1), wherein the water phase further contains an oil-in-water type resin emulsion and/or a water-soluble resin;

(5) A stencil printing emulsion ink according to item (1), wherein no resin is contained in the oil phase; and (6) A stencil printing emulsion ink according to item (4), wherein the water-soluble resin is contained in the range from 1 to 20% by weight as a reduced solid based on the total amount of the emulsion ink.

Since as an outer phase of the W/P type emulsion ink, the oil has a permeability which is larger and a surface tension which is lower than those of the water phase, respectively, the oil phase component permeates into the substrate to be printed in advance of the water phase and then the water phase permeates and/or splashes the substrate.

In the W/O type emulsion ink of the invention, the permeability of the oil phase components into the substrate to be printed is improved because given that the water-insoluble coloring agent is contained in the water phase, there is no need to contain the resin components for dispersing or fixing the coloring agent in the oil phase. Further, the water phase components cannot permeate into the interior of the substrate to be printed and are kept and dry on the surface thereof. As a result, the printing ink concentration in printed areas is improved and strike through and bleeding of the ink is prevented.

In the case where the water-insoluble coloring agent is presented in the oil phase as shown in the prior art, the permeation velocity of the oil phase components is lowered and the time required for the permeation and drying of the ink is longer. In contrast thereto, however, in the emulsion ink of the invention, the drying property of the ink is improved since the permeation of the oil phase components proceeds swiftly.

Furthermore, since there is no need to contain any resin components in the oil phase, the temperature dependence of the ink is lessened and the resulting stable ink feed is maintainable against any temperature change.

A water-in-oil (W/O) type emulsion ink of the invention is produced by adding gradually, e.g., a water phase (W) component of 90-30% by weight to an oil phase (O) component of 10–70% by weight and emulsifying the resulting mixture.

In the present invention, a water-insoluble coloring agent is contained in the water phase component. The mean particle diameter of the water-insoluble coloring agent is preferably 10 μm or less and more preferably, 3 μm or less.

When the mean particle diameter of the coloring agent exceeds 10 μm, the W/O type emulsion ink is easily collapsible. Also, the amount of the water-insoluble coloring agent added is preferably in the range from 1 to 30% by weight to the total amount of the emulsion ink and, more preferably, in the range of 3 to 10% by weight.

As a water-insoluble coloring agent, known pigments can be used, but it is preferable to use one which has good affinity to water which is a main solvent. For example, carbon black and the like, such as furnace carbon black, lamp black, acetylene black and channel black, for monochrome color, metals such as copper, iron and titanium oxide, and organic pigments, such as ortho-nitroaniline black and the like, are exemplified. Also, various pigments generally used in color printing can be applied.

In the water phase component, an O/W type resin emulsion and/or a water-soluble resin is preferably contained to improve the dispersibility of the water-insoluble coloring agent and the sticking tendency of the same to paper.

As an O/W type resin emulsion, for example, resin emulsions contained polyvinyl acetate, ethylene-vinyl acetate copolymer, vinyl acetate-acrylic ester copolymer, polymethacrylate, polystyrene, styrene-acrylic ester copolymer, styrene-butadiene copolymer, vinylidene chloride-acrylic ester copolymer, polyvinyl chloride, vinyl chloride-vinyl acetate copolymer, polyurethane or the like, can be used.

As a water-soluble resin, for example, polyvinyl alcohol, methyl cellulose, carboxymethyl cellulose, hydroxymethyl cellulose, polyvinyl pyrolidone, polyethylene-polyvinyl ether, polyacrylamide, gum arabic, starch, water-soluble polyurethane or the like can be used.

Each of these resin components is to be added, preferably in an amount of 1–20% by weight as a reduced solid based on the total amount of the emulsion ink, and more preferably, in the range of 2–10% by weight. In that case where the amount of the resin component to be added is too small, the coloring agent components in the water phase cannot be completely fixed to the substrate to be printed. Also in that case where the amount of the resin component is too large, upon sitting for a long period of time after platemaking, the ink forms a film at the perforation portion of the platemaking to eventually prevent the passage of the ink.

For improving the wettability, dispersibility and the like of the water-insoluble coloring agent in water, the water phase components can also include an ionic surface active agent, amphoteric surface active agent, nonionic surface active agent or surface active agent of a polymer, silicone, or fluorine compound.

Furthermore, the water phase components can contain a water-soluble additive such as a wetting agent, electrolytes, antiseptic, antioxidant, evaporation preventing agent or the like.

The oil phase components in the invention can contain a nonvolatile solvent, a volatile solvent, an emulsifier and the like.

As a nonvolatile solvent, a mineral type oil, such as a motor oil, spindle oil, machine oil, liquid paraffin or the like, and a vegetable oil, such as an olive oil, a castor oil, or a salad oil can be used. Also, as a volatile solvent, a known mineral oil type solvent and vegetable type solvent can be used. The use ratio of these agents (nonvolatile agent/volatile agent) is different depending on the compound ratio between the oil and water phases, but the range of 50–95/50-5 at the weight ratio is preferable.

An emulsifier is used for constituting a W/O type emulsion, and a nonionic surface active agent is preferably used. For example, Sorbitan higher fatty acid ester (e.g., Sorbitan monolaurate, Sorbitan monopalmitate,), fatty acid monoglyceride (e.g., oleic acid monoglyceride, oleic acid diglyceride), an ethylene oxide adduct of higher alcohol, alkyl phenol, fatty acid or the like can be exemplified. The water phase components of the invention contain, in some cases, surface active agents for dispersing the water-insoluble coloring agent or those for constituting an O/W type resin emulsion. Thus, it is preferable to properly select an emulsifier so that the W/P type emulsion is not collapsed depending on these surface active agents and the like.

DETAILED DESCRIPTION OF THE PREFERRED EMBODIMENTS

The detailed description of the invention will be given with reference to the accompanying examples. It should be understood, however, that these examples do not limit any scope of the present invention. Incidentally, parts shown in the following examples indicate parts by weight.

EXAMPLE 1

A W/O type emulsion ink was prepared by the following method on the basis of the compound shown in Table 1.

First of all, deionized water, ethylene glycol, furnace carbon black and sulfonic acid type surface active agent were fully stirred and dispersed by a ball mill. Polyacrylic acid ester (emulsion) was added to this dispersed solution and the mixture was stirred again to prepare a water phase. Then, motor oil No. 40, Nisseki Solvent No. 5, and Sorbitan monooleate were fully stirred to prepare an oil phase. The resulting oil phase was emulsified using a stirrer by adding the water phase to this oil phase gradually to give a stencil printing emulsion ink.

The mean particle diameter of the water-insoluble coloring agent shown in Table 1 was measured by a centrifugal type particle diameter measurement apparatus CAPA-700 (Horiba Seisaku Co., Ltd. product).

EXAMPLES 2–5

Following the same procedure as in Example 1, each stencil printing emulsion ink was prepared except that a composition of the ink is varied as shown in Table 1.

COMPARATIVE EXAMPLE 1

Following the same procedure as in Example 1, a stencil printing emulsion ink was prepared, except that a carboxylic acid type surface active agent was used as a dispersing agent in Example 1 and the mean particle diameter of the dispersed water-insoluble coloring agent was adjusted to 12.0 μm. The compound of this emulsion ink is given in Table 2.

COMPARATIVE EXAMPLE 2

A W/O type emulsion ink was prepared by the following method on the basis of the composition shown in Table 2.

First of all, alkyd resin, furnace carbon black, motor oil No. 4-, Nisseki Solvent No. 5, and Sorbitan monooleate were fully stirred, and sufficiently kneaded with triple rollers to give an oil phase. Then, this oil phase was emulsified by adding a mixture of deionized water and ethylene glycol gradually to give a stencil printing emulsion ink.

COMPARATIVE EXAMPLES 3–5

Following the same procedure as in Comparative Example 2, each stencil printing emulsion ink was prepared except that the composition shown in Table 2 was used.

TABLE 1

|  |  | W/O type emulsion ink composition (parts by weight) | | | | |
| --- | --- | --- | --- | --- | --- | --- |
|  |  | Example 1 | Example 2 | Example 3 | Example 4 | Example 5 |
| Oil Phase |  |  |  |  |  |  |
| Nonvolatile solvent | Motor oil No. 40 | 13.0 | 13.0 | 13.0 | 13.0 | 13.0 |
| Volatile solvent | Nisseki solvent No. 5 | 3.0 | 3.0 | 3.0 | 3.0 | 3.0 |
| Emulsifier | Sorbitan Monooleate | 2.0 | 2.0 | 2.0 | 2.0 | 2.0 |
| Resin | Alkyd resin |  |  |  |  |  |
| Water Phase |  |  |  |  |  |  |
| Water-insoluble coloring agent *1 | Furnace carbon black | 4.0 (0.8) | 4.0 (0.8) |  |  |  |
|  | Cyanine blue |  |  | 4.0 (2.0) |  |  |
|  | Cyanine green |  |  |  | 4.0 (1.3) |  |
|  | Pigment yellow |  |  |  |  | 4.0 (1.6) |
| water | Deionized water | 61.0 | 66.0 | 62.0 | 62.0 | 62.0 |
| Dispersing agent | Sulfonic acid type surface active agent | 1.0 | 1.0 |  |  |  |
| O/W type resin emulsion | Polyacrylic acid ester (solid content: 50%) | 10.0 |  | 10.0 | 10.0 | 10.0 |
| Water-soluble resin | P.V.A (polymerization degree: 1500 or more) |  | 5.0 |  |  |  |
| Wetting agent | Ethylene glycol | 6.0 | 6.0 | 6.0 | 6.0 | 6.0 |

*1: The parentheses indicate a mean particle diameter (μm).

TABLE 2

|  |  | W/O type emulsion ink composition (parts by weight) | | | | |
| --- | --- | --- | --- | --- | --- | --- |
|  |  | Comp. ex 1 | Comp. ex 2 | Comp. ex 3 | Comp. ex 4 | Comp. ex 5 |
| Oil Phase |  |  |  |  |  |  |
| Nonvolatile solvent | Motor oil No. 40 | 13.0 | 8.0 | 7.0 | 7.0 | 7.0 |
| Volatile solvent | Nisseki solvent No. 5 | 3.0 | 3.0 | 3.0 | 3.0 | 3.0 |
| Emulsifier | Sorbitan Monooleate | 2.0 | 2.0 | 2.0 | 2.0 | 2.0 |
| Resin | Alkyd resin |  | 10.0 | 10.0 | 10.0 | 10.0 |
| Water Phase |  |  |  |  |  |  |
| Water-insoluble coloring agent *1 | Furnace carbon black |  | 4.0 (0.5) |  |  |  |
|  | Cyanine blue |  |  | 4.0 (1.8) |  |  |
|  | Cyanine green |  |  |  | 4.0 (1.2) |  |
|  | Pigment yellow |  |  |  |  | 4.0 (1.3) |
| Water-insoluble coloring agent *2 | Furnace carbon black | 4.0 (12.0) |  |  |  |  |
| water | Deionized water | 61.0 | 67.0 | 68.0 | 68.0 | 68.0 |
| Dispersing agent | Carboxylic acid type surface active agent | 1.0 |  |  |  |  |
| O/W type resin emulsion | Polyacrylic acid ester (solid content: 50%) | 10.0 |  |  |  |  |
| Water-soluble resin | P.V.A (polymerization degree: 1500 or more) |  |  |  |  |  |
| Wetting agent | Ethylene glycol | 6.0 | 6.0 | 6.0 | 6.0 | 6.0 |

*1 and *2: The parentheses indicate a mean particle diameter (μm).

By use of each stencil printing emulsion ink obtained in Examples 1 through 5 and Comparative Examples 1 through 5, stencil printing was carried out by means of a stencil printing machine, Risograph RC115D (product of the Riso Kagaku Corporation, registered Trademark). A test was made for each printed ink concentration, strike through property, bleeding property, temperature suitability and dispersion stability in the printed matters obtained, and the results thus obtained are given in Table 3.

(1) Printed concentration: the printed concentration in the printed set-solid portion was measured by an OD meter, RD920 (Makbeth Co. product).
(2) Strike through property: the concentration on the rear surface side of the printed set-solid portion was measured by the OD meter (the same above).
(3) Bleeding property: the bleeding condition of a portion attached with the ink was observed using a microscope at a magnification of ×80. In the case that the bleeding was almost none, the sign of an open circle is given, and the crossed mark is given for the case that the bleeding was remarkable.
(4) Temperature suitability: a stencil printing was carried out at a low temperature (5° C.), and the printed concentration in the set-solid portion printed was measured by the OD meter (the same above).
(5) Dispersion stability: after the ink was left at 50° C. for one week, the ink collapsing condition was visually observed and the resulting estimation was made by marking with an open circle for the case when the emulsion ink was not collapsed and with a crossing mark for the case when it was collapsed.

TABLE 3

|  | Examples | | | | | Comparative Examples | | | | |
| --- | --- | --- | --- | --- | --- | --- | --- | --- | --- | --- |
|  | 1 | 2 | 3 | 4 | 5 | 1 | 2 | 3 | 4 | 5 |
| Printed Concentration | 1.21 | 1.22 | 1.15 | 1.18 | 1.13 | 1.08 | 1.08 | 1.01 | 0.99 | 0.95 |
| Strike through | 0.14 | 0.12 | 0.14 | 0.14 | 0.15 | 0.13 | 0.21 | 0.22 | 0.21 | 0.20 |
| Bleeding | 0 | 0 | 0 | 0 | 0 | 0 | X | X | X | X |
| Temperature suitability | 1.17 | 1.15 | 1.12 | 1.14 | 1.11 | 1.02 | 0.92 | 0.85 | 0.81 | 0.80 |
| Dispersion suitability | 0 | 0 | 0 | 0 | 0 | X | 0 | 0 | 0 | 0 |

Apparent from Table 3, it was found that in Examples 1 through 5, each emulsion ink has a high printed concentration, is excellent in strike through property and bleeding, and gives less influence on the printed concentration even though a low temperature printing may be carried out, in comparison with those of Comparative Examples 2 through 5. Also, in Comparative Example 1, the water-insoluble coloring agent is contained in the water phase. However, since the mean particle diameter is too large, it was found that the emulsion ink is inferior in dispersion stability.

EFFECTS OF THE INVENTION

According to the W/O type emulsion ink of the invention, since a water-insoluble coloring agent is contained in the water phase thereof, the printed concentration is high, and the ink can be dried without generating any strike through and bleeding of the ink, resulting in saving the drying time therefor. Since no coloring agent components are presented in the oil phase, the resin components as a dispersing agent and a sticking agent in these coloring agent components can be removed from the oil phase. Accordingly, it becomes possible to improve the permeability of the ink and give an ink having less variation in viscosity thereof against temperature change.

What we claimed is:

1. A water-in-oil stencil printing emulsion ink having a water phase dispersed in an oil phase, wherein said emulsion ink consists of 10 to 70% by weight of oil phase and 90 to 30% by weight of a water phase, and said water phase contains a water-insoluble coloring agent having a mean particle diameter of 10 microns or less.

2. A stencil printing emulsion ink according to claim 1, wherein said water-insoluble coloring agent is contained in the range from 1 to 30% by weight to the total amount of said emulsion ink.

3. A stencil printing emulsion ink according to claim 1, wherein said water phase further contains an oil-in-water resin, a water-soluble resin, or a combination thereof.

4. A stencil printing emulsion ink according to claim 1, wherein no resin is contained in said oil phase.

5. A stencil printing emulsion ink according to claim 3, wherein said water-soluble resin is contained in the range from 1 to 20% by weight as a reduced solid basis versus the total amount of an emulsion ink.

6. A water-in-oil stencil printing emulsion ink having a water phase dispersed in an oil phase, wherein said emulsion ink consists of 10 to 70% by weight of oil phase and 90 to 30 % by weight of water phase, and wherein said water phase contains a water-insoluble coloring agent and an oil-in-water resin emulsion, a water soluble resin, or a mixture thereof.

7. The stencil printing emulsion ink according to claim 6 wherein said water-soluble resin is contained in a range from 1 to 20% by weight as a reduced solid based on the total amount of the emulsion ink.

* * * * *